June 8, 1965  J. W. GWINN  3,187,597
AUXILIARY SPROCKET MOUNTING FOR MOTORCYCLE
Filed Jan. 11, 1963  3 Sheets-Sheet 1

INVENTOR.
JAMES W. GWINN
BY *Wells & St. John*
ATTYS.

INVENTOR.
JAMES W. GWINN
BY
ATTYS.

June 8, 1965 J. W. GWINN 3,187,597
AUXILIARY SPROCKET MOUNTING FOR MOTORCYCLE
Filed Jan. 11, 1963 3 Sheets-Sheet 3

INVENTOR.
JAMES W. GWINN
BY *Wells & St. John*
ATTYS.

United States Patent Office 3,187,597
Patented June 8, 1965

3,187,597
AUXILIARY SPROCKET MOUNTING FOR MOTORCYCLE
James W. Gwinn, Rte. 1, Box 110, Pomeroy, Wash.
Filed Jan. 11, 1963, Ser. No. 250,937
1 Claim. (Cl. 74—244)

This invention relates to a novel mounting for chain driven vehicles such as motorcycles.

The present invention is concerned with the mounting of an auxiliary sprocket on a motorcycle or similar chain driven vehicle where the speed ratio of the vehicle must be changed at intervals so as to adapt the vehicle to the terrain on which it is to be maneuvered. The popularity of such vehicles for hiking and hunting purposes particularly requires a larger diameter driven sprocket coupled to the driven wheel so as to enable the motorcycle to be used on grades which are impassable with standard equipment. To date the problem with such sprocket changes has been the necessity of carrying an auxiliary sprocket on the motorcycle in an external bag or carrier and the resulting inconvenience of dismantling the rear wheel in order to mount the sprocket in its driven position.

The present invention contemplates a mounting which enables one to carry the sprocket on the wheel itself and which further enables one to change from one sprocket to another without dismantling the wheel assembly.

It is a first object of this invention to provide a novel sprocket mounting on a driven wheel whereby the sprocket is carried in a co-axial position about the wheel axle so that the sprocket may be positioned for a driving connection without removing the normal sprocket and without dismantling the wheel assembly.

Another object of this invention is to provide such a novel auxiliary sprocket mounting which enables the user to change from one sprocket to another without requiring special tools or skills.

Another object of this invention is to greatly lessen the time required to change from one sprocket to another so that such changes may be made more frequently and with less physical labor.

Another object of this invention is to provide such a mounting which will not in any manner interfere with the normal operation of the vehicle.

These and other objects will be evident from a study of the following disclosure taken in conjunction with the accompanying drawings which illustrate one form of the invention. Since the exemplary vehicle illustrated in the drawings is not exhaustive of the many models available on the market, or which might be available in the future, the specific configurations illustrated are merely illustrative and are not designed to limit or restrict the scope of the invention.

Figure 1:
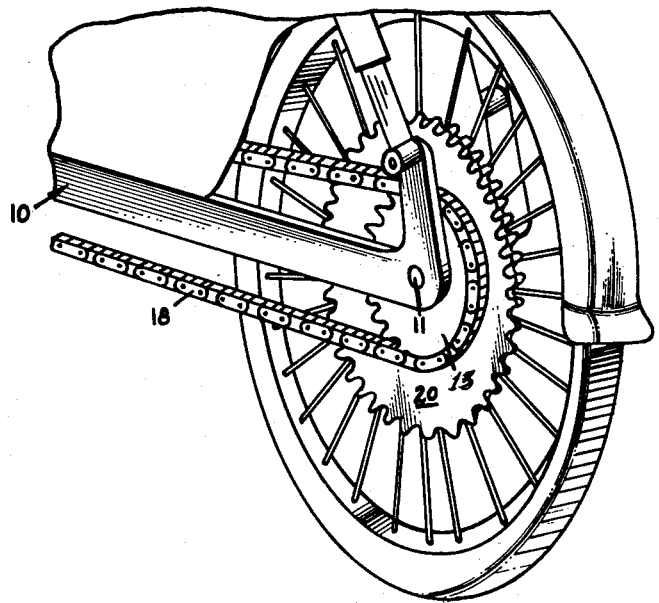
FIGURE 1 is a fragmentary perspective view of the rear driven wheel on a typical motorcycle.
Figure 2:
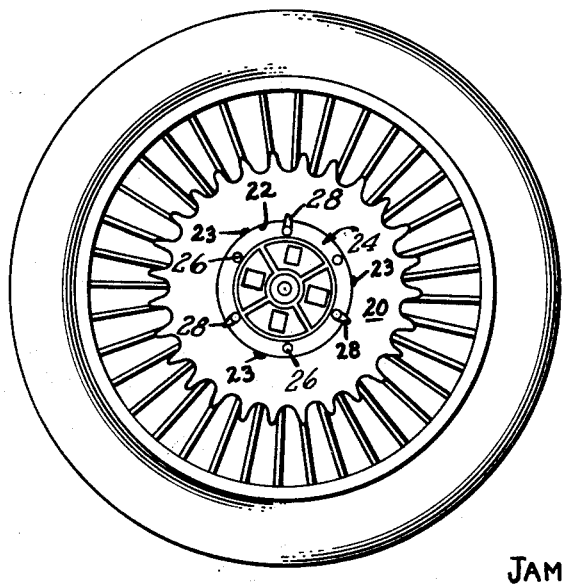
FIGURE 2 is a side view of the wheel as shown in FIGURE 1, removed from the motorcycle and with the normal driven sprocket not shown in this view.
Figure 3:
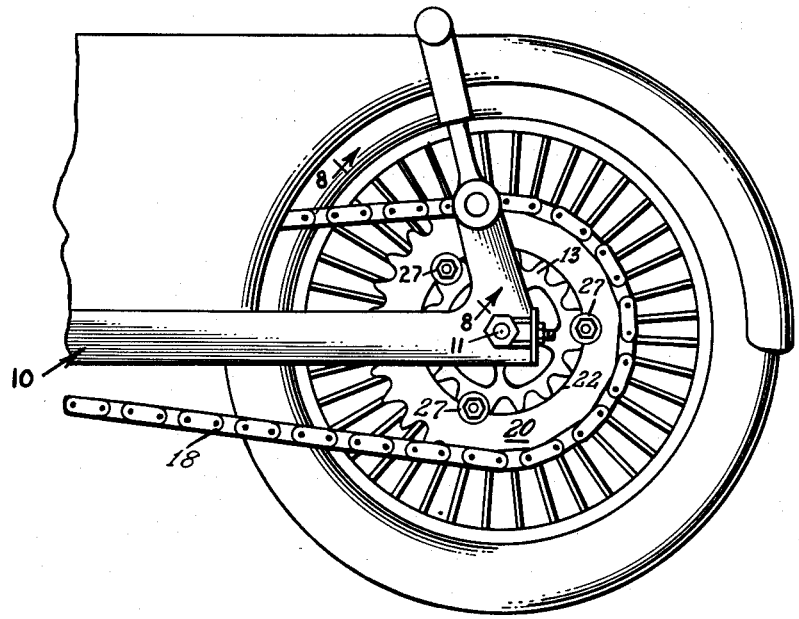
FIGURE 3 is a side view of the rear wheel assembly seen in FIGURE 1, with the enlarged sprocket shown in its driving position.

FIGURE 1 shows the rear driven wheel of a motorcycle such as is used commonly for hiking and hunting in hilly or mountainous areas. Such vehicles normally are equipped with one or more driven sprockets which must be chosen to accommodate the terrain on which the vehicle is to operate. On level ground a smaller sprocket is desirable for greater speed, while a hilly or rough terrain requires a larger sprocket for greater power and less speed. As seen in FIGURE 1, the motocycle includes a mounting frame generally designated as 10 and an axle 11 fixed to the frame 10. Mounted on the axle 11 for free rotation relative thereto is a wheel hub 12. This mounting can best be seen in FIGURE 4. Drivingly connected to the wheel hub 12 is a first sprocket 13. Sprocket 13, as illustrated, is a relatively small diameter sprocket as would be used for normal highway use. The sprocket 13 is fixed to a connector 14 having protruding lugs 15 which engage within apertures 16 formed on the wheel hub 12. The sprocket 13 therefore drives the wheel hub 12 through the connection between lugs 15 and apertures 16. Mounted at the side of the wheel hub 12 is a brake apparatus generally designated as 17 utilized to stop the vehicle when desired. The sprocket 13 is driven by means of a chain 18 powered by a motor (not shown) on the frame 10.

In the past, when a larger sprocket was necessary in order to operate on uneven or hilly terrain, one had to dismount the wheel hub 12 from the frame 10 after first disconnecting the chain 18. The sprocket 13 and connector 14 were then removed and a larger sprocket was fixed to the connector 14 and the entire assembly was again assembled and mounted on the frame 10, with additional links being placed in the chain 18. This required a considerable amount of time and necessitated accurate placement of the wheel hub 12 on the frame 10 so as to insure the proper transverse alignment of the axle 11.

Figure 8:
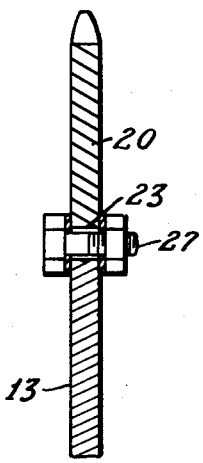
FIGURE 8 is an enlarged sectional view taken along line 8—8 in FIGURE 3, showing the connection between the normal sprocket and the enlarged sprocket.

According to the present invention, an enlarged second sprocket 20 is carried co-axially adjacent to the wheel hub 12 on a mounting plate 24. The sprocket 20 is provided with the normal outside peripheral configuration adapted to be engaged by the chain 18 and includes an enlarged inner aperture 22 which is co-axial with the outside periphery of sprocket 20. Mounted about the aperture 22 are three semicircular recesses 23. The recesses 23 are adapted to cooperate with the outer periphery of the first sprocket 13. The second sprocket is adapted to be mounted on the first sprocket 13 as a radial extension thereof, as illustrated in FIGURE 8. When so mounted, three bolt assemblies 27 are required to clamp the second sprocket 20 to the first sprocket 13 by passing through the recesses 23 and the complementary recesses at the outer periphery of sprocket 13. The enlarged shoulders of the bolt assemblies 27 then act as clamps to insure the alignment of the two sprockets 13 and 20 and to provide a driving connection between one and the other.

Figure 4:
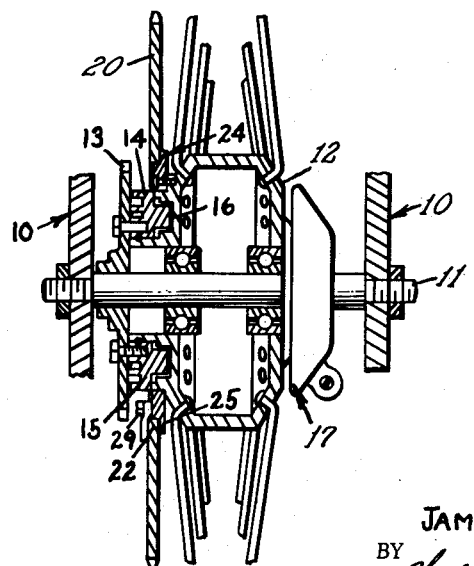
FIGURE 4 is an enlarged sectional view through the hub of the wheel illustrated in FIGURE 3, with the enlarged sprocket shown in its storage position.
Figure 5:
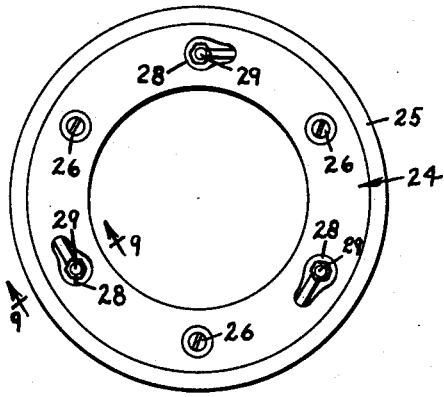
FIGURE 5 is an enlarged side view of the mounting plate for the enlarged sprocket.
Figure 6:
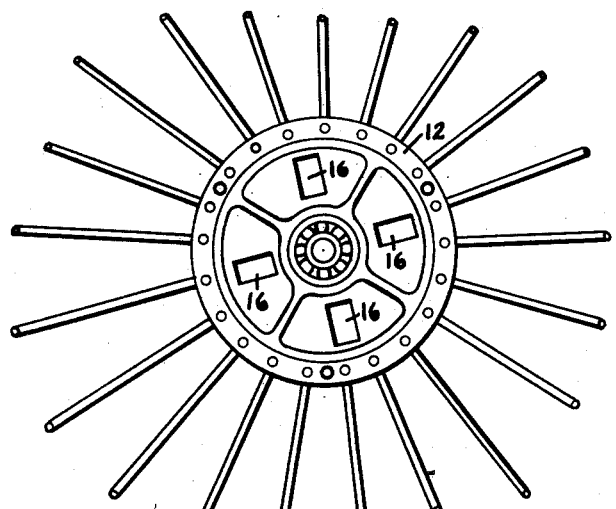
FIGURE 6 is a fragmentary side view of the wheel hub.
Figure 7:
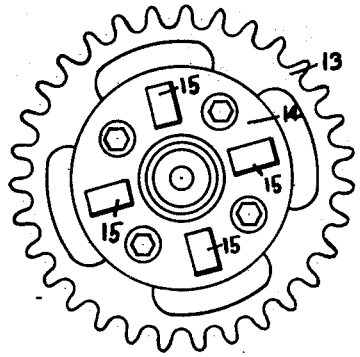
FIGURE 7 is a side view of the normal driven sprocket taken from inside the wheel and looking outwardly.
Figure 9:
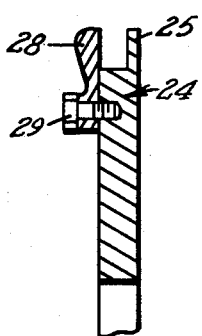
FIGURE 9 is an enlarged sectional view taken along line 9—9 in FIGURE 5, showing the sprocket clamp in its clamping position.

The storage position of the second sprocket 20 is illustrated in FIGURE 4. It is fixed to a mounting plate 24 having an external shoulder 25 that is formed so as to be abutted by the second sprocket 20. The second sprocket 20 is to be carried co-axially with the wheel hub 12 when fixed to the mounting plate 24 so as to insure the necessary balance of the wheel assembly. The second sprocket 20 is clamped to the mounting plate 24 by means of clamps 28 which may be pivoted from a released position illustrated in FIGURE 5, to an engageable clamp position illustrated in FIGURE 9. By tightening the bolts 29 which hold the clamps 28 to the mounting plate 24, one may securely mount the sprocket 20 to the wheel hub 12. The mounting plate 24 itself is fixed to the wheel hub 12 by means of screws 26.

In order to adapt this mounting to a typical motorcycle one need only to remove the wheel hub 12 from the frame once to mount the plate 24 and sprocket 20 thereon. This can be readily accomplished by drilling the wheel hub 12 for the reception of screws 26 and clamping the plate 24 to the wheel hub 12 as shown in FIGURE 4. The second sprocket 20 is then fixed to the mounting plate 24 by the releasable clamps 28. The second sprocket 20 may be carried on the wheel hub 12 in this manner until it is necessary to utilize it for driving purposes.

When a larger sprocket is desired by the rider, he merely disengages the chain 18 and unlocks the second sprocket 20 from the mounting plate 24 by releasing the clamps 28. The second sprocket 20 may then be slipped over the first sprocket 13 as a radial extension thereof and may be readily fastened to the first sprocket 13 by means of the bolt assemblies 27 which may be carried in one's pocket or in a bag on the frame 10 of the motorcycle. The secured sprocket 20 may then be engaged by the chain 18 which must be lengthened by additional links, also carried in one's pocket or in a suitable bag. This entire operation takes only a few minutes and requires no exceptional skills and no unusual tools other than those which would be normally carried on such a vehicle. The sprocket 20 is returned to its storage position by the reverse procedure, and may be carried on the wheel hub without interfering in any manner with the normal operation of the motorcycle.

Thus I have described a simple mounting for a secondary sprocket which readily enables one to change sprocket sizes without removing the driven wheel from the motorcycle frame. Since many models of such vehicles do exist, slight modifications in the physical structures may be necessary to accommodate this invention to a particular motorcycle. However, the basic idea of carrying the sprocket on a mounting plate 24 for ready installation as an extension to the normal driving sprocket will remain constant and is applicable to any motorcycle. For this reason the invention is not to be limited by the specific details enumerated above but only by the following claim.

Having thus described my invention, I claim:

An auxiliary sprocket attachment for a motorcycle the drive wheel of which has a hub and a drive sprocket for the hub coaxially and spaced axially from the hub and non rotatably coupled to the hub, said attachment comprising:

a sprocket ring having its central aperture complementary in diameter to the outside diameter of said sprocket and notched interiorly at spaced points;

a centering member affixed to said hub and having a peripheral surface coaxial with the hub and complementary in diameter to the inside diameter of said sprocket ring;

said centering member having a shoulder extending outwardly beyond the said peripheral surface; and manually releasable clamp means on the member operably holding the sprocket ring against the shoulder of said member in storage position.

References Cited by the Examiner

UNITED STATES PATENTS

| | | | |
|---|---|---|---|
| 601,990 | 4/98 | Suter | 74—244 |
| 1,825,083 | 9/31 | Morse | 74—325 |
| 2,199,331 | 4/40 | Carlsson | 74—244 |
| 2,237,394 | 4/41 | Smith | 74—243 X |
| 2,575,582 | 11/51 | Chamberlain. | |
| 2,689,483 | 9/54 | Senna | 74—230.16 |

DON A. WAITE, *Primary Examiner.*